March 4, 1947. C. W. HAWTHORNE 2,416,920
POWDER DUSTER
Filed June 8, 1944 2 Sheets-Sheet 2
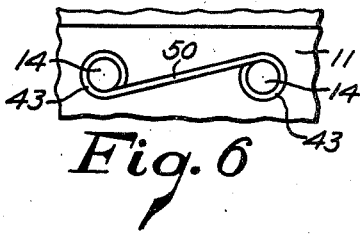
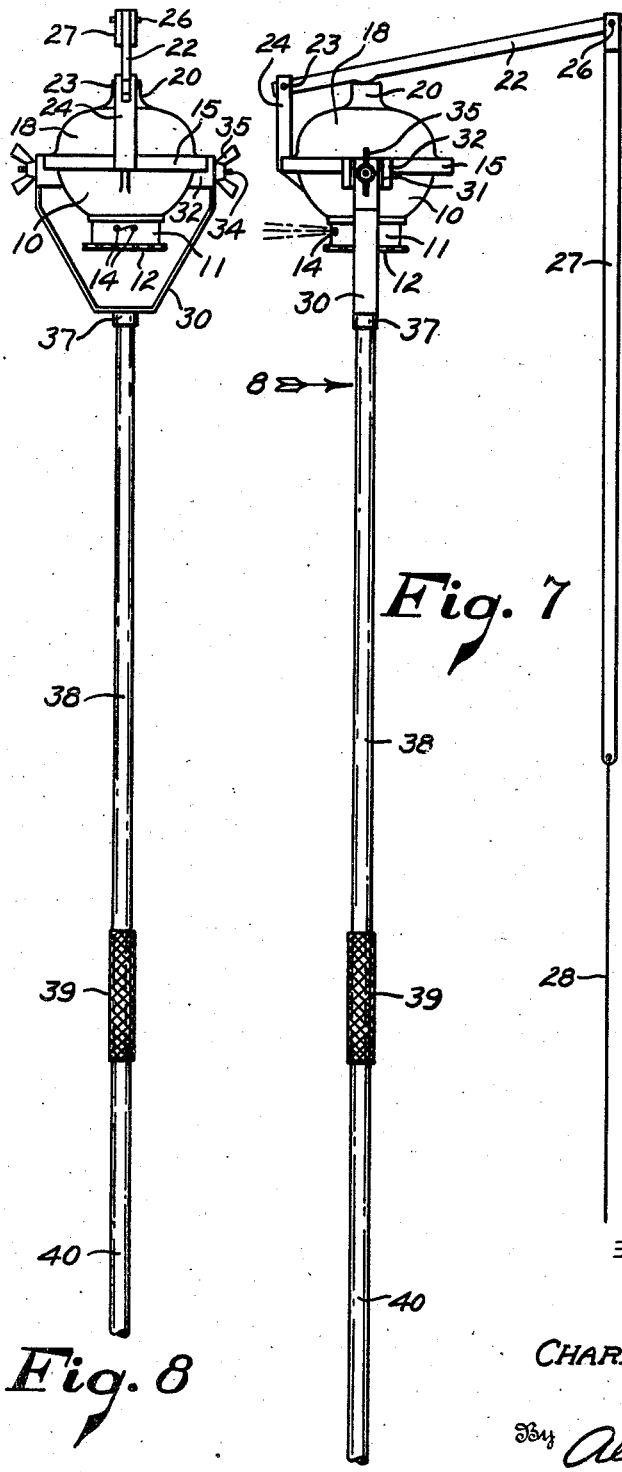
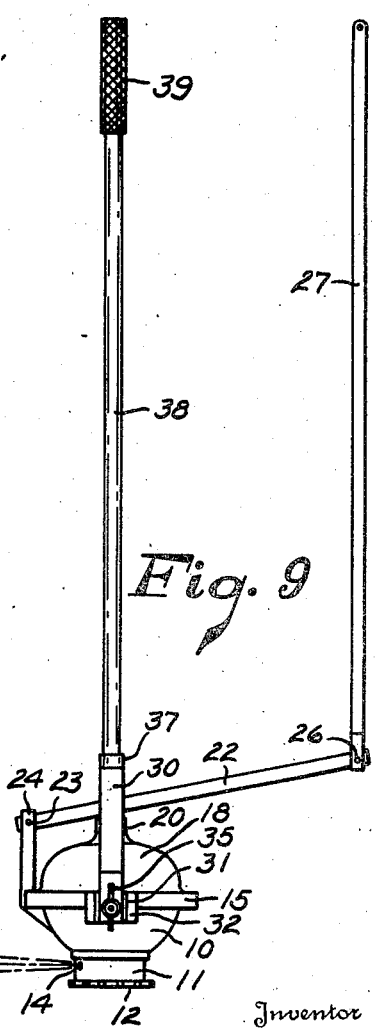
Inventor
CHARLES W. HAWTHORNE
By Albert G. Blodgett
Attorney Patented Mar. 4, 1947

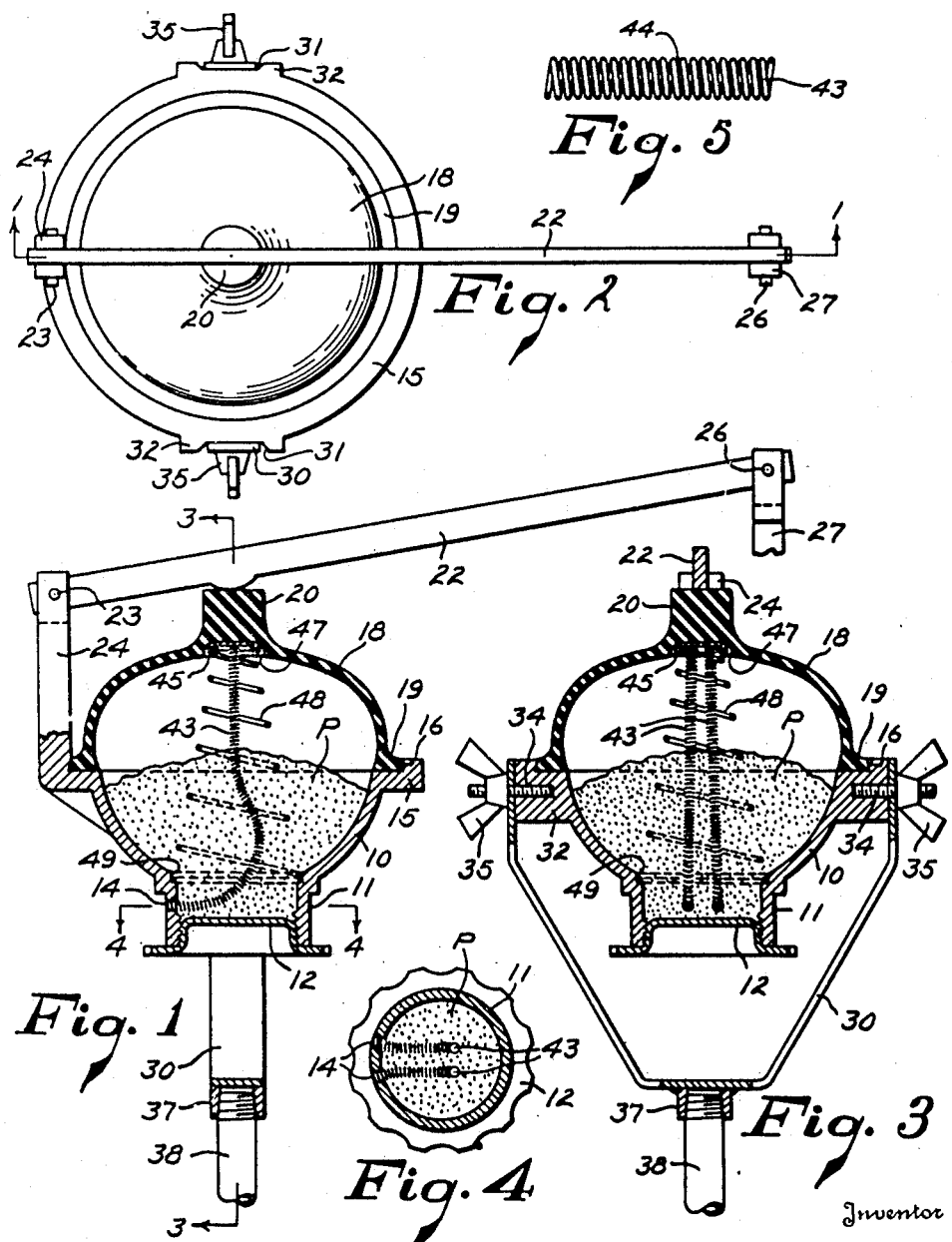

2,416,920

UNITED STATES PATENT OFFICE 2,416,920

POWDER DUSTER

Charles W. Hawthorne, Conneautville, Pa.

Application June 8, 1944, Serial No. 539,250

11 Claims. (Cl. 43—146)

This invention relates to powder dusters, and more particularly to devices for discharging a jet or stream of powder in suspension in an air blast, such devices being commonly used for applying powdered insecticides to plants, shrubs, and the like.

Powder dusters as heretofore constructed have been subject to many difficulties. One of the most common troubles encountered in the operation of these devices has been a decided tendency for the discharge passages to become clogged with powder. This necessitates frequent cleaning of these passages. Furthermore, the dust is not discharged uniformly, and the operator has to shake the apparatus continually in order to obtain any appreciable discharge. These devices are also inconvenient and tiresome to operate, and they are not suitable for dusting low-growing plants or high vegetation such as trees.

It is accordingly one object of the invention to provide a powder duster which will operate in a thoroughly dependable manner without clogging.

It is a further object of the invention to provide a powder duster which will discharge powder in a uniform stream without any shaking of the apparatus.

It is a further object of the invention to provide a powder duster which will be easy and convenient to operate.

It is a further object of the invention to provide a powder duster which can be used for dusting either tall trees or low-growing plants.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a vertical section through a powder duster, the section being taken substantially on the line 1—1 of Fig. 2;

Fig. 2 is a top plan view of the apparatus;

Fig. 3 is a section on the line 3—3 of Fig. 1;

Fig. 4 is a section on the line 4—4 of Fig. 1;

Fig. 5 is an enlarged detail of a portion of a spring;

Fig. 6 is an enlarged fragmentary elevation of the apparatus, showing the discharge orifices;

Fig. 7 is an elevation on a reduced scale showing the apparatus adjusted for dusting trees;

Fig. 8 is an elevation taken in the direction of the arrow 8 in Fig. 7; and

Fig. 9 is an elevation showing the apparatus adjusted for dusting low-growing plants.

The embodiment illustrated comprises a powder receptacle having a bowl-shaped portion 10 and a hollow cylindrical portion or sleeve 11 extending downwardly from the bowl. The lower end of the sleeve 11 is screw-threaded internally to receive a closure in the form of a removable plug 12. The sleeve 11 is provided with one or more orifices 14 from which a jet of powder and air may be discharged, as will be hereinafter described. Two of these orifices 14 are illustrated in laterally adjacent positions slightly above the top of the plug 12. The upper edge of the bowl 10 is provided with a horizontal flange 15 having an annular undercut internal groove 16 in its upper surface. The top of the bowl 10 is closed by a cap 18 of rubber or the like shaped as an inverted bowl, the lower edge of this cap having a flange 19 with an outer surface of the proper size to fit tightly within the groove 16. A mass of powder P may be placed in the receptacle by inverting the bowl 10 and removing the plug 12.

The air blast for ejecting the powder through the orifices 14 is produced by forcing the central portion of the rubber cap 18 downwardly toward the bowl 10. For this purpose an upwardly projecting boss 20 is formed on the top of the cap, and this boss is engaged by a generally horizontal lever 22. This lever is fulcrummed at one end on a pin 23 carried by a post 24 which projects upwardly from the flange 15, preferably on the same side of the device as the orifices 14. The other end of the lever 22 is pivotally connected by a pin 26 to one end of a vertical rod 27 which may extend either upwardly or downwardly as may be more convenient for operation of the lever. When the rod 27 extends downwardly, as shown in Fig. 7, a cord 28 may be attached to its lower end. By pulling on this cord the operator may swing the lever 22 downwardly and thus compress the cap 18. Upon release of the cord, the cap will return to its original shape by reason of its resiliency. When the rod 27 extends upwardly, as shown in Fig. 9, the operator may grasp the rod directly.

In order that the apparatus may be held in a position for proper dusting of trees, plants, etc., a handle is provided which may be adjusted in a desired manner relative to the powder receptacle. As illustrated this handle comprises a yoke 30 which straddles the bowl 10, the ends of this yoke fitting within shallow vertical grooves 31 formed in bosses 32 on diametrically opposite sides of the flange 15. The ends of the yoke are held in the grooves by studs 34 and wing nuts 35. The sides of the grooves 31 are preferably beveled, as shown in Fig. 2, and the construction is such that after loosening the wing nuts 35 the operator can swing the yoke 30 from the downwardly extending position shown in Fig. 7 to the upwardly extending position shown in Fig. 9, the studs 34 serving as pivots. The yoke will flex enough to release its ends from the grooves during the swinging movement, and it is shaped to avoid interference with the post 24 and the lever 22. At the center of the yoke there is provided a hollow boss 37 which is screw-threaded internally to receive one end of a vertical pipe 38 (Fig. 7), the other end of this pipe having a knurled sleeve 39 secured thereto. This sleeve is preferably screw-threaded internally to receive a further vertical pipe 40 which may be made as long as necessary to support the receptacle near the tops of the trees to be dusted.

Referring now to Fig. 1, it will be apparent that upon downward movement of the lever 22 the cap 18 will compress the air and tend to eject a stream of air and powder from the orifices 14. However, with the construction as so far described the orifices will become clogged very quickly if there is any substantial mass of powder within the receptacle. In order to prevent such clogging, I provide two tubes 43 which connect the respective orifices 14 with the air space within the cap 18, these tubes extending through the powder mass P. The tube walls are formed with openings through which powder may enter the tubes partly by a mechanical sifting action but largely by the inspirating effect of the air blasts traveling along the tubes. Preferably the tubes are in the form of helical wire springs, as best shown in Fig. 5, with the convolutions slightly spaced apart. Thus, with the spring straight, there will be a continuous narrow helical slit 44 available for the entrance of air and powder. Bending of the spring will reduce the width of this slit at the inner side of the bend and increase its width at the outer side of the bend.

The flexible spring tubes 43 are preferably connected to the cap 18 in such a manner that when the cap is flexed up and down the springs will be compelled to bend back and forth, thus varying the width of the slit 44. This will facilitate the entrance of the powder into the tube, it will prevent blocking of the slit, and it will agitate the mass of powder within the receptacle, for as the spring is bent it will flop around in various directions. For this purpose the upper ends of the springs are secured by soldering or otherwise to a small button 45 which fits within a recess 47 in the cap 18, directly beneath the boss 20. It is not necessary that the upper ends of the springs be left open, as air can enter the springs freely between the convolutions thereof. The button 45 is held upwardly in the recess 47 by means of a light conical coiled spring 48 which surrounds the springs 43. The large lower end of this spring 48 rests in an annular seat or groove 49 formed in the upper portion of the sleeve 11. The lower ends of the springs 43 extend through the orifices 14 with a rather tight fit, and they may be connected by a short piece of wire 50 (Fig. 6) on the outside of the sleeve 11 to hold them in position. The two springs can be made by first forming a single long spring and then straightening a portion at the center thereof to provide the connecting piece 50.

The operation of the invention will now be apparent from the above disclosure. The receptacle will be inverted and filled with powder, the plug 12 being removed for this purpose. If trees are to be dusted, the parts will then be arranged as shown in Fig. 7, with the pipe 38 extending downwardly, and the pipe 40 inserted in the sleeve 39 to increase the length of the handle, whereby the bowl 10 may be supported at any desired height. The rod 27 and cord 28 will hang downwardly from the lever 22, and by pulling on the cord the lever may be actuated as desired. If low-growing plants are to be dusted, the parts will be arranged as shown in Fig. 9, the yoke 30 and pipe 38 being swung upwardly after first loosening the wing nuts 35, and the rod 27 extending upwardly. The pipe 40 will be removed, and the operator will grasp the sleeve 39 and actuate the lever 22 by means of the rod 27, no stooping being required. In dusting very low plants the device may rest directly upon the ground. As the rubber cap 18 is flexed up and down by the action of the lever 22, blasts of air will be forced along the interior of the spring tubes 43 and outwardly through the orifices 14. Powder will enter these tubes by mechanical sifting and by the inspirating effect of the air streams, and this powder will be entrained by the air and discharged therewith. Movement of the cap 18 will cause the tubes 43 to flex, varying the width of the slit 44 and preventing clogging thereof. At the same time the tubes 43 will flop about laterally within the powder mass to agitate the same and prevent caking. The powder mass will also be agitated by the flexing of the spring 48. Since the powder cannot reach the orifices 14 except as it is carried therethrough in suspension in the air blast, these orifices will never become clogged with powder. The powder will be discharged in a uniform manner, and no shaking of the receptacle is required. The lever provides a considerable mechanical advantage, and very little force is required for its operation. The apparatus is comparatively simple and inexpensive to manufacture, and thoroughly dependable in service.

Having thus described my invention, what I claim as new and desire to secure by Letters Patent is:

1. A powder duster comprising a receptacle shaped to retain a mass of powder and provided with a discharge orifice, a tube extending through the receptacle to the orifice, and means to force a stream of air through the tube to the orifice, the tube having a narrow helical slit therein through which powder will be drawn from the said mass by the inspirating action of the air stream.

2. A powder duster comprising a receptacle shaped to retain a mass of powder and provided with a discharge orifice, a helical wire spring forming a tube extending through the receptacle to the orifice, and means to force a stream of air through the spring to the orifice, the convolutions of the spring being slightly spaced apart to provide a narrow helical slit through which powder will be drawn from the said mass by the inspirating action of the air stream.

3. A powder duster comprising a receptacle shaped to retain a mass of powder and provided with a discharge orifice in its lower portion, a helical wire spring forming a tube connected at its lower end to the orifice and extending upwardly through the receptacle, the convolutions of the spring being spaced apart to form a narrow helical slit through which the powder must pass to reach the orifice, and means to force a stream of air downwardly through the interior of the spring toward the orifice to entrain and discharge the powder.

4. A powder duster comprising a receptacle shaped to retain a mass of powder and provided with a discharge orifice, a flexible tube extending through the receptacle and connected at one end to the orifice, the tube having a lateral opening therein through which powder may enter the tube, and a flexible closure for the receptacle movable back and forth to force a stream of air through the interior of the tube toward the orifice to entrain and discharge the powder, the tube being so connected to the said closure that movements thereof will cause the tube to bend and thereby agitate the powder mass.

5. A powder duster comprising a receptacle shaped to retain a mass of powder and provided with a discharge orifice, a helical wire spring forming a tube extending through the receptacle and connected at one end to the orifice, the convolutions of the spring being spaced apart to form a narrow helical slit through which the powder must pass to reach the orifice, and a flexible closure for the receptacle movable back and forth to force a stream of air through the interior of the spring toward the orifice to entrain and discharge the powder, the spring being so connected to the said closure that movements thereof will cause the spring to bend.

6. A powder duster comprising a powder receptacle having a bowl-shaped upper portion and a hollow cylindrical lower portion provided with a laterally directed discharge orifice, a removable closure for the lower end of the said lower portion, the said upper portion having a flange at its upper edge provided with an annular undercut groove, and a cap of rubber or the like shaped as an inverted bowl closing the top of the receptacle, the lower edge of the cap having an annular flange shaped to fit tightly within the groove, the cap being arranged to flex up and down to discharge air and powder from the orifice.

7. A powder duster comprising a powder receptable having an upper edge provided with an annular undercut groove, the receptacle having a discharge orifice, a cap of rubber or the like shaped as an inverted bowl closing the top of the receptacle, the lower edge of the cap having an annular flange shaped to fit tightly within the groove, and a generally horizontal lever fulcrummed at one end on one side of the receptacle and extending across the top of the cap, the lever engaging the cap to flex the cap vertically and discharge air and powder from the orifice.

8. A powder duster comprising a powder receptacle having a discharge orifice, a flexible closure for the receptacle movable back and forth to discharge air and powder from the orifice, an elongated handle to support the receptacle, and fastening means to secure the handle to the receptacle in either of two optional positions in one of which the handle extends downwardly from the receptacle and in the other of which the handle extends upwardly from the receptacle.

9. A powder duster comprising a powder receptacle having a discharge orifice, a flexible closure for the receptacle movable back and forth to discharge air and powder from the orifice, a yoke straddling the receptacle, an elongated handle connected to the yoke, and fastening means to secure the yoke to the receptacle in either of two optional positions in one of which the handle extends downwardly from the yoke and in the other of which the handle extends upwardly from the yoke.

10. A powder duster comprising a powder receptacle having a discharge orifice, a flexible closure for the receptacle movable back and forth to discharge air and powder from the orifice, a yoke straddling the receptacle and pivotally connected thereto about a horizontal axis, an elongated handle connected to the yoke, and fastening means to secure the yoke to the receptacle in either of two optional positions in one of which the handle extends downwardly from the yoke and in the other of which the handle extends upwardly from the yoke.

11. A powder duster comprising a powder receptacle having a discharge orifice, a flexible cap closing the top of the receptacle and arranged to flex up and down to discharge air and powder from the orifice, a generally horizontal lever fulcrummed at one end on one side of the receptacle and extending across the top of the cap, the lever engaging the cap to flex the same, a yoke straddling the receptacle and pivotally connected thereto about a horizontal axis transverse to the lever, an elongated handle connected to the yoke, fastening means to secure the yoke to the receptacle in either of two optional positions in one of which the handle extends downwardly from the yoke, and in the other of which the handle extends upwardly from the yoke and the yoke straddles the lever, and a rod connected to the other end of the lever to actuate the same.

CHARLES W. HAWTHORNE.

REFERENCES CITED

The following references are of record in the file of this patent:

UNITED STATES PATENTS

| Number | Name | Date |
|---|---|---|
| 312,252 | Chinnock | Feb. 17, 1885 |
| 2,219,208 | Knight | June 17, 1939 |
| 347,405 | White and Gray | Aug. 17, 1886 |
| 2,080,864 | Hilts | May 18, 1937 |
| 2,107,615 | Mellen | Feb. 8, 1938 |
| 459,915 | Ludde | Sept. 22, 1891 |
| 1,451,138 | Bernstein | Apr. 10, 1923 |